3,597,412
BASIC TRIAZOLE CONTAINING MONO-AZO DYESTUFFS
Reinhard Mohr and Johann Ostermeier, Offenbach am Main, Germany, assignors to Farbwerke Hoechst Aktiengesellschaft vormals Meister Lucius & Bruning, Frankfurt am Main, Germany
No Drawing. Continuation-in-part of application Ser. No. 522,057, Jan. 21, 1966. This application Jan. 8, 1969, Ser. No. 789,963
Int. Cl. C09b 29/06; D06p 1/02
U.S. Cl. 260—146  7 Claims

ABSTRACT OF THE DISCLOSURE

Basic azo dyestuffs of the formula:

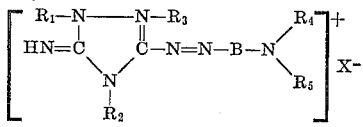

wherein $R_1$ is aryl, $R_2$ and $R_3$ are alkyl or aralkyl, $R_4$ and $R_5$ are unsubstituted or substituted alkyl or aralkyl or are joined together to form a ring, B is a divalent benzene or naphthalene radical and $X^-$ is an anion.

---

This application is a continuation-in-part of our application Ser. No. 522,057 filed Jan. 21, 1966, now abandoned.

The present invention provides new basic azo dyestuffs and a process for preparing them. It provides, more specifically basic azo dyestuffs free from acid dissociating, salt-forming groups, for example sulfonic acid or carboxylic acid groups, and whose cation corresponds to the general formula $$[D—N=N—A]^+$$

in which D represents the radical of a 1,2,4-trisubstituted 5-imino-4,5-dihydro-1,2,4-triazolium cation of the general formula

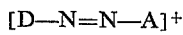
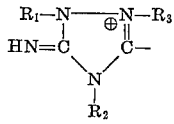

and A stands for the radical of a tertiary amine of the benzene or naphthalene series of the general formula

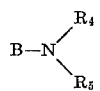

in which B, $R_4$ and $R_5$ have the meanings given below.

Thus the new basic azo dyestuffs free from sulfonic acid or carboxylic acid groups, correspond to the general formula

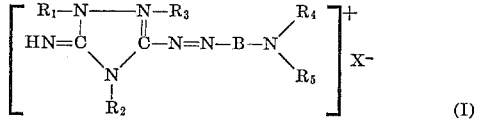

in which $R_1$ represents an aryl radical, $R_2$ and $R_3$ stand for an alkyl or aralkyl radical, $R_4$ and $R_5$ represent lower alkyl radicals which may be substituted or closed to form a ring, or aralkyl radicals, B represents the radical of a benzene or naphthalene series and $X^-$ stands for an anion. Illustrative of these definitions are dyestuffs of Formula I wherein $R_1$ represents phenyl, chlorophenyl, nitrophenyl, lower alkylphenyl, lower alkoxy-phenyl, benzyl-phenyl, lower alkylsulfonyl-phenyl, phenylsulfonyl-phenyl, carbacylaminophenyl, trifluoromethylphenyl or naphthyl, $R_2$ and $R_3$ each represent lower alkyl or benzyl, $R_4$ and $R_5$ each represent lower alkyl, lower chloroalkyl, lower fluoroalkyl, lower hydroxyalkyl, lower cyanoalkyl, lower alkoxyalkyl, lower phenoxyalkyl or benzyl, or—closed with one other and together with the nitrogen atom being attached—piperidino, morpholino or piperazino, B represents phenylene or naphthylene or phenylene substituted by chlorine, lower alkyl, lower alkoxy, carboxylic acid lower alkylester, lower alkylsulfonyl or carbacylamino, and $X^-$ represents an anion.

The dyestuffs defined above, having the general Formula I, can be prepared:
(a) by treating an azo dyestuff of the general formula

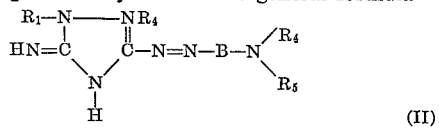

in which $R_1$, $R_4$, $R_5$ and B have the meanings given above, with an alkylating agent or
(b) by coupling the diazonium compound of a quaternary amine of the general formula

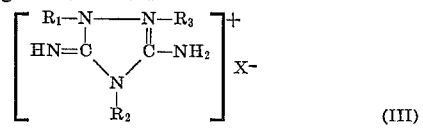

in which $R_1$, $R_2$, $R_3$ and $X^-$ have the meanings specified above, with a coupling component coupling in the p-position to the

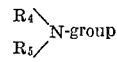

and having the general formula

in which $R_4$, $R_5$ and B have the meanings given above.

The method (a) is especially advantageous and can be generally applied. With this method of operation not only quaternation occurs but also, simultaneously, alkylation of the triazoline ring. The alkylation is facilitated by addition of basic compounds, for example sodium carbonate, soduim acetate, calcium oxide, calcium carbonate, sodium bicarbonate, magnesium oxide or magnesium carbonate.

As appropriate alkylating agents there enter into consideration preferably the following compounds containing alkyl groups which can easily be split off: alkyl or aralkyl halides, alkyl esters of sulfuric acid or organic sulfonic acids. In some cases there may also be used alkylating epoxide compounds or ethylene compounds capable of reacting, for example, acrylic acid amide.

The reaction according to the present process with the alkylating agents may be effected in indifferent organic solvents at a temperature within the range from 50° to 150° C., the quaternary compounds of the Formula I in many cases precipitating automatically and being separated by simple filtration. As solvents there may be used, for instance, aliphatic, cycloaliphatic or aromatic hydrocarbons boiling at temperatures within the range from 50° to 150° C., moreover aliphatic or cyclic compounds which contain halogen atoms and are stable under the applied conditions, for example carbon tetrachloride, tetrachloroethane, chloroform, tetrachlorethylene, mono- and dichloro-benzene. Appropriate compounds are also nitrohydrocarbons such as nitrobenzene, ketones such as acetone or methylethylketone, carboxylic acid amides such as dimethylformamide or N-methyl-acetamide, moreover alcohols such as methanol or ethanol, glycols or glycolalkyl ethers. Usually the choice of appropriate solvents depends on the solubility and the chemical constitution of the azo dyestuff to be quaternated. In some cases, however, it is advantageous to carry out the reaction in an excess of the alkylating agent. If the quaternated dyestuffs cannot be separated from the solvent by filtration, it is possible to remove the solvents used, for example, by distilling them off, if desired or required, under reduced pressure, or by distilling them with steam. In many cases, however, a simple extraction with warm water of the solvents non miscible with water is sufficient. The purification of the dyestuffs obtained according to the process of the present invention is advantageously carried out by dissolving them in water, whereupon the starting dyestuffs which are insoluble in water are separated by filtration. From the aqueous solution, which, if required, is clarified with charcoal, the prepared cationic dyestuffs of the Formula I can either be salted out or isolated in form of their complex salts with zinc or cadmium halides.

The dyestuffs obtained according to the process of the present invention which correspond to the Formula I contain an anion $X^-$ preferably the radical of a strong acid, for example the radical of sulfonic acid or of the semi-esters thereof, of an aryl-sulfonic acid or of a hydrohalic acid. These anions used for the present process may be replaced by the anions of other acids, for example of phosphoric acid, acetic acid, oxalic acid, lactic acid or tartaric acid.

The azo dyestuffs used as starting materials in the process of method (a) which correspond to the general Formula II can be prepared in a generally known manner, for example by coupling diazotised 3-amino-1-aryl-5-imino-4,5-dihydro-1,2,4-triazoles of the general formula

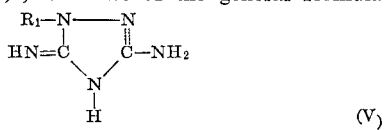

with coupling components of Formula IV, or by a alkaline condensation of 3-amino-1-aryl-5-imino-4,5-dihydro-1,2,4-triazoles of Formula V with the corresponding p-nitroso compounds of the tertiary amines corresponding to Formula IV. The compounds of Formula V are obtainable by the reaction of an aryl hydrazine with dicyandiamide.

As 3-amino-1-aryl-5-imino - 4,5-dihydro-1,2,4-triazoles of Formula V there are used for example the 1-phenyl- or 1- or 2-naphthyl compounds thereof, which may contain, if desired, in the aryl radical substituents, for example halogen atoms, alkyl, aralkyl, alkoxy, nitro, alkylsulfonyl, arylsulfonyl, acylamino or trifluoromethyl groups. As coupling components of Formula IV there are used, according to the present process, for example benzene or naphthalene compounds coupling in the p-position to the

which do not contain carboxylic acid or sulfonic acid groups. The radicals $R_4$ and $R_5$ may represent lower alkyl radicals, for example methyl, ethyl, propyl or butyl radicals, which, if desired, may contain further substituents such as chlorine or fluorine atoms, hydroxy, cyano, phenyl, alkoxy or phenoxy groups. The alkyl groups may, if desired, form with the nitrogen atom to which they are attached hydrogenated hetero-cyclic rings, which may contain further nitrogen or oxygen atoms, for example the piperidine, morpholine or piperazine rings. The benzene or naphthalene radical B may contain further substituents such as halogen atoms, alkyl, alkoxy, carbalkoxy, alkylsulfonyl or acylamino groups.

The quaternary amines of Formula III used according to method (b) can be prepared by treatment of amines of Formula V with alkylating agents such as alkyl or aralkyl halides, or alkyl or aralkyl esters of sulfuric acid or of organic sulfonic acids, advantageously in organic solvents.

The diazotation of the amines of the Formula III is carried out according to known methods, for example, by means of hydrochloric acid and sodium nitrite. The coupling with the coupling components of Formula IV is also effected in known manner, for example, in a neutral or acid medium, if desired or required, in the presence of buffer substances or agents accelerating the coupling, for example pyridine.

The new dyestuffs are appropriate for the dyeing or printing of tannin-treated cellulose fibres, silk, leather or fully synthetic fibres, such as acetate rayon, or polyamide fibres, particularly fibres consisting of polyacrylonitrile or polyvinylidene cyanide. In the majority of cases the dyeings produced with the present dyestuffs on these fibres are very clear and deep in color and have, in general, good fastness to light and to wetting as well as to solvents and to heat. Under normal dyeing conditions wool is completely resisted by the dyestuffs.

The dyestuffs are not affected to any great degree by variation of the pH-value of the dyeing bath and can thus be applied in a strongly acid, weakly acid, neutral or weakly alkaline medium. The products of the instant invention may, therefore, advantageously be used in combination with substantive dyestuffs for the dyeing of mixed yarns or fabrics consisting of polyacrylonitrile and vegetable fibers, which dyeing process has to be carried out in a neutral or alkaline medium.

The following examples serve to illustrate the invention but they are not intended to limit it thereto.

EXAMPLE 1

(a) 35 g. of 3-amino-1-phenyl-5-imino-4,5-dihydro-1,2,4-triazole are introduced within 30 minutes into 80 cc. of sulfuric acid of 78% strength at temperatures between 30 and 35° C. After 60 minutes a clear solution has formed, which is cooled to 10° C. whereupon 32 cc. of nitrosylsulfuric acid of 43.1% strength are dropped in within 30 minutes. Stirring is continued for 30 minutes and the diazonium salt solution is poured into a suspension of 26.6 g. of N,N-dimethyl-aniline in 400 g. of ice and 100 cc. of water while thoroughly stirring. On completion of the coupling the sulfate of the dyestuff is filtered with suction, washed with a small quantity of water and stirred with approximately 500 cc. of water to a thickly liquid suspension. This suspension is made distinctly alkaline by means of sodium hydroxide solution, the dyestuff of the formula

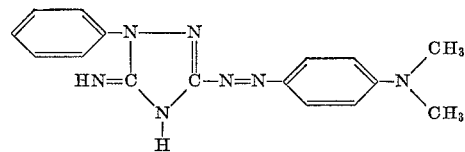

which precipitates in form of yellow brown crystals, is filtered with suction, washed with water until the alkaline agents are removed and dried at 60° C.

(b) 61.4 g. of the dyestuff thus obtained are mixed with 300 cc. of methanol to form a paste, 20 g. of magnesium oxide are added and the batch is then mixed within 15 minutes at 50° C. with 60 cc. of dimethyl sulfate. Stirring is continued for 20 minutes at 65° C., whereupon the initially yellow suspension dissolves producing a blue red color. On completion of the alkylation the methyl alcohol is distilled off and the remaining residue is dissolved until clear, by addition of 1,000 cc. of water and 80 cc. of 5 N hydrochloric acid. 20 cc. of zinc chloride solution of 70% strength are subsequently added to the blue red solution and the dyestuff formed is salted out with 150 g. of sodium chloride. The zinc chloride complex salt of the dyestuff cation of the formula

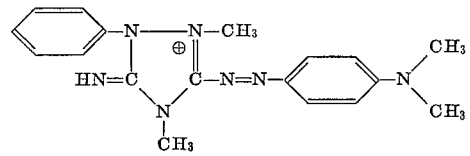

which separates almost quantitatively in form of deeply dark bordeaux colored crystals having a green surface luster, is filtered with suction and dried at 60° C. Approximately 100 g. of a dyestuff containing as impurity a small quantity of sodium chloride, are obtained which dissolve easily in water producing a yellowish red color which in thin film is bluish red.

For the preparation of printings 30 g. of the dyestuff thus obtained are dissolved by heating with 50 g. of β,β'-dihydroxydiethyl-sulfide, 30 g. of cyclohexanol, 50 g. of acetic acid of 30% strength and 390 g. of water and the solution is stirred into 450 g. of a crystal gum thickener 1:20. This printing paste is printed on a fabric made of polyacrylonitrile staple fibres. The printing obtained is dried, steamed for 30 minutes at a pressure of 0.7 atmosphere, soaped at 50° C. in a bath which contains 1 g. of a condensation product of oleic acid and methyl taurine per litre of water, rinsed and dried in known manner. Thus a well-fixed, clear scarlet print of good fastness to light, washing, perspiration, milling, cross-dyeing, hypochlorite, bleaching, peroxide bleaching, carbonizing, ironing, dry heat fixation, decatizing, solvents and dry cleaning is obtained.

EXAMPLE 2

61.4 g. of the dyestuff prepared according to Example 1(a) are stirred together with 10 g. of magnesium oxide in 1,000 cc. of chlorobenzene and mixed with 60 cc. of diethyl sulfate within 30 minutes at 100° to 120° C. During the alkylation the yellow brown suspension dissolves producing a deep blue red color. After heating for two hours to 100° to 120° C. the alkylation mixture is cooled and the crystals which have separated are sucked off at 10° C. For the further purification the cationic dyestuff obtained can be separated from its aqueous solution in the form of the zinc chloride complex salt, as described in Example 1(b). After drying at 60° C. green shining deep bordeaux colored crystals are obtained in a yield of approximately 100 g. The zinc chloride complex salt whose dyestuff cation corresponds to the formula

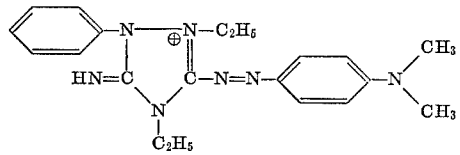

dissolves very easily in water producing a red color and is identical with the dyestuff of Example 1 as regards its tinctorial behaviour.

EXAMPLE 3

(a) 35 g. of 3-amino-1-phenyl-5-imino-4,5-dihydro-1,2,4-triazole are diazotised in the manner described in Example 1(a). A solution of 38 g. of 3-chloro-N,N-diethyl-aniline in 20 cc. of sulfuric acid of 78% strength are added, the whole is stirred for 10 minutes and the mixture is dropped into a solution of approximately 5 mols of sodium acetate in 500 cc. of water and 500 g. of ice. The dyestuff of the formula

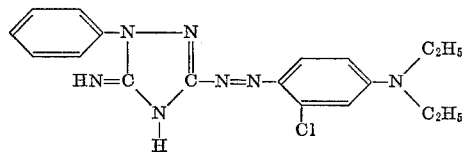

separates as orange yellow crystals which are sucked off, washed with water and dried at 60° C.

(b) 3.7 g. of the dyestuff are heated together with 0.5 g. of magnesium oxide in 50 cc. of chlorobenzene. Subsequently a solution of 2.1 cc. of dimethyl sulfate in 10 cc. of chlorobenzene is dropped in within 15 minutes at 100° C. The initially yellow suspension dissolves producing a dark red color. The solution is heated for another 2 hours until the reaction is complete and the reaction mixture is stirred into 200 cc. of water. The methyl sulfate of the alkylated dyestuff dissolves producing a yellowish red color being bluish red in thin film. After the separation of the organic solvent the aqueous solution is worked up according to Example 1(b), whereupon after drying, 8 g. of the zinc chloride complex salt of the dyestuff cation of the formula

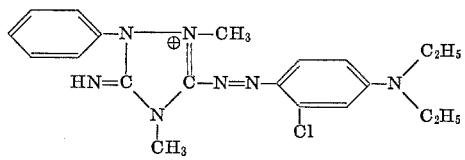

are obtained in the form of deeply dark bordeaux colored crystals having a green surface luster. The product obtained dissolves very easily in water or diluted acetic acid. To prepare the dyeings 1 g. of the dyestuff thus obtained is mixed by stirring with 2 g. of acetic acid of 50% strength and dissolved in 5 l. of water. After introducing 100 g. of washed yarn made of polyacrylonitrile staple fibre at 60° C. into the dyeing bath the temperature is gradually raised to 100° C. and the yarn is dyed for one hour at boiling temperature. Subsequently the whole is slowly cooled to 70° C., rinsed and dried. A clear scarlet dyeing is obtained having very good fastness to light, washing, perspiration, milling, cross dyeing, hypochlorite bleaching, peroxide bleaching, carbonizing, ironing, dry heating fixation, decatizing, solvents and dry cleaning.

The following table lists further azo dyestuffs obtained according to the process of the present invention, which correspond to Formula I, as well as the shades obtained by these dyestuffs on polyacrylonitrile fibres.

| | | | B—N$\begin{smallmatrix}R_4\\ \\R_5\end{smallmatrix}$ | |
|---|---|---|---|---|
| $R_1$ | $R_2$ | $R_3$ | $R_5$ | Shade |
| Phenyl | Methyl | Methyl | N,N-diethyl-aniline | Red. |
| Do | do | do | 3-methyl-N,N-diethyl-aniline. | Red. |
| Do | do | do | 3-methyl-N,N-dimethyl-aniline. | Red. |
| Do | do | do | 3-chloro-N,N-dimethyl-aniline. | Red. |
| Do | do | do | N-(3'-methylphenyl)-morpholine. | Red. |
| Do | do | do | N-(3'-chlorophenyl)-morpholine. | Red. |
| Do | do | do | N-methyl-N-benzyl-aniline. | Red. |
| Do | do | do | 3-methyl-N,N-di-β-hydroxyethyl-aniline. | Red. |
| 4-methylphenyl | do | do | N,N-dimethyl-aniline | Scarlet. |
| Do | do | do | N,N-diethyl-aniline | Red. |
| Do | do | do | 3-chloro-N,N-diethyl-aniline. | Red. |
| 4-nitrophenyl | do | do | N,N-dimethyl-aniline. | Bluish-red. |
| Do | do | do | N,N-diethyl-aniline | Red. |
| Do | do | do | 3-chloro-N,N-diethyl-aniline. | Red. |
| 4-chlorophenyl | do | do | N,N-dimethyl-aniline. | Red. |
| Do | do | do | 3-chloro-N,N-diethyl-aniline. | Red. |
| Do | do | do | N,N-diethyl-aniline | Red. |
| Do | do | do | N-ethyl-N-β-cyanoethyl-aniline. | Red. |
| Do | do | do | N-ethyl-N-β-chloroethyl-aniline. | Red. |
| Do | do | do | N,N-dimethyl-1-naphthyl-amine. | Red. |
| Do | do | do | N,N-dibenzyl-aniline. | Red. |
| Do | do | do | N,N-dibutyl-aniline. | Red. |
| Do | do | do | 3-ethoxy-N,N-diethyl-aniline. | Red. |
| Do | do | do | 3-acetylamino-N,N-dimethyl-aniline. | Red. |
| 1-naphthyl | do | do | N,N-dimethyl-aniline. | Red. |
| 2-naphthyl | do | do | do | Red. |
| Do | do | do | N,N-di-β-hydroxyethyl-aniline. | Red. |
| 4-methoxyphenyl. | do | do | N,N-dimethyl-aniline. | Red. |

We claim:
1. A basic azo dyestuff free from sulfonic acid and carboxylic acid groups having the general formula

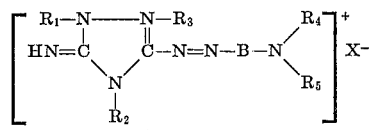

wherein $R_1$ represents phenyl, chlorophenyl, nitrophenyl, lower alkyl-phenyl, lower alkoxy-phenyl, benzyl-phenyl, lower alkyl-sulfonyl phenyl, phenylsulfonyl-phenyl, trifluoromethylphenyl or naphthyl, $R_2$ and $R_3$ each represent lower alkyl or benzyl, $R_4$ and $R_5$ each represent lower alkyl, lower chloroalkyl, lower fluoroalkyl, lower hydroxyalkyl, lower cyanoalkyl, lower alkoxyalkyl, lower phenoxyalkyl or benzyl, or—closed with one other and together with the nitrogen atom being attached—piperidino, morpholino or piperazino, B represents phenylene or naphthylene or phenylene substituted by chlorine, lower alkyl, lower alkoxy, carboxylic acid lower alkylester, lower alkylsulfonyl or acetylamino, and $X^-$ represents an anion.

2. The basic azo dyestuff according to claim 1, wherein $R_1$ represents phenyl, chlorophenyl, nitrophenyl, methylphenyl, methoxyphenyl, or naphthyl, $R_2$ and $R_3$ each represent methyl or ethyl, $R_4$ and $R_5$ each represent lower alkyl, lower chloroalkyl, lower hydroxyalkyl, lower cyanoalkyl or benzyl, or—closed with one another and together with the nitrogen atom being attached—morpholino, B represents phenylene or naphthylene or phenylene substituted by chlorine, methyl, ethoxy, acetylamino, and the anion $X^-$ represents $CH_2SO_4^-$, $Cl^-$ or $ZnCl_4^{--}/2$.

3. The basic azo dyestuff having the formula

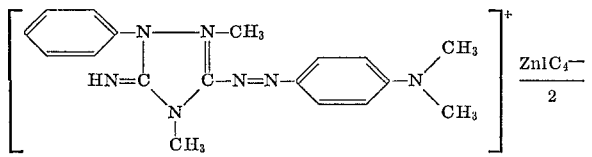

4. The basic azo dyestuff having the formula

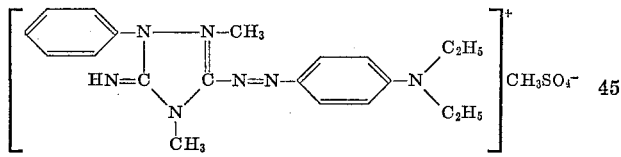

5. The basic azo dyestuff having the formula

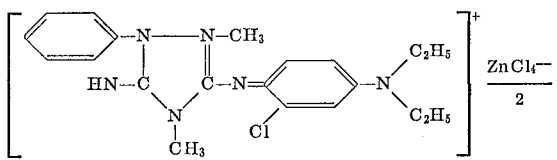

6. The basic azo dyestuff having the formula

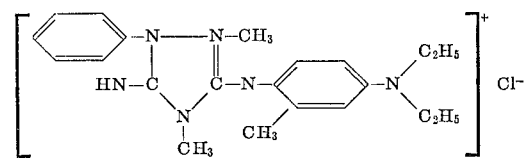

7. The basic azo dyestuff having the formula

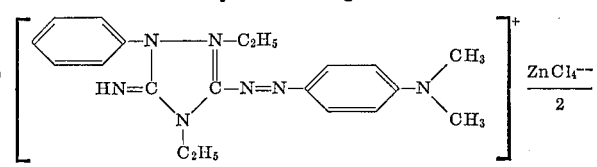

References Cited
UNITED STATES PATENTS

| | | | |
|---|---|---|---|
| 2,883,373 | 4/1959 | Bossard et al. | 260—146 |
| 3,102,878 | 9/1963 | Baumann et al. | 260—146 |

CHARLES B. PARKER, Primary Examiner

D. M. PAPUGA, Assistant Examiner

U.S. Cl. X.R.

26—157, 299, 308R; 8—13, 41, 42, 178

UNITED STATES PATENT OFFICE
CERTIFICATE OF CORRECTION

Patent No. 3,597,412  Dated August 3, 1971

Inventor(s) Reinhard Mohr and Johann Ostermeier

It is certified that error appears in the above-identified patent and that said Letters Patent are hereby corrected as shown below:

In claim 5 change:

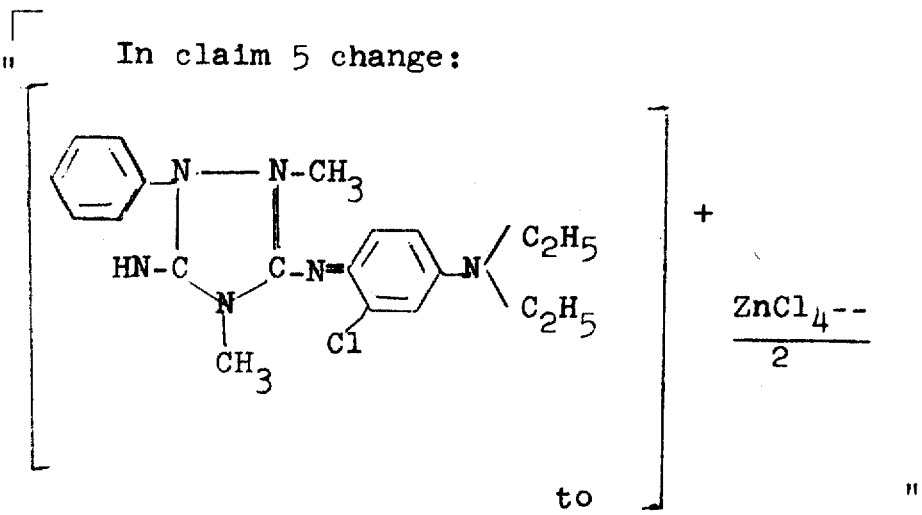

to

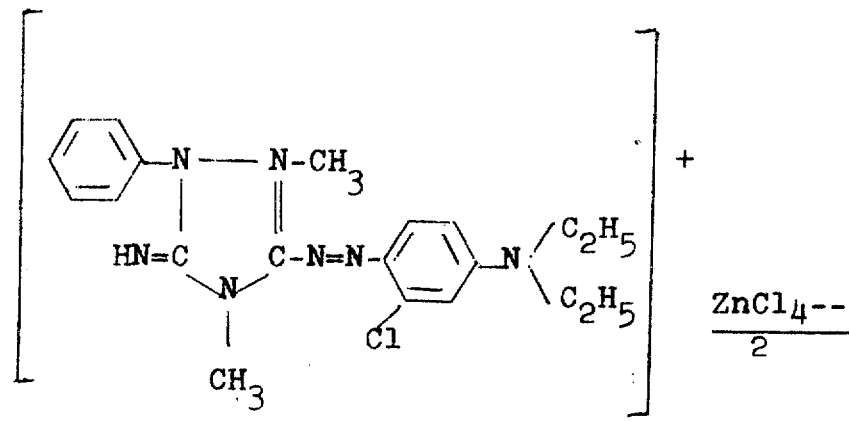

UNITED STATES PATENT OFFICE
CERTIFICATE OF CORRECTION

Patent No. 3,597,412   Dated August 3, 1971

Inventor(s) Reinhard Mohr and Johann Ostermeier   PAGE - 2

It is certified that error appears in the above-identified patent and that said Letters Patent are hereby corrected as shown below:

In claim 6 change:

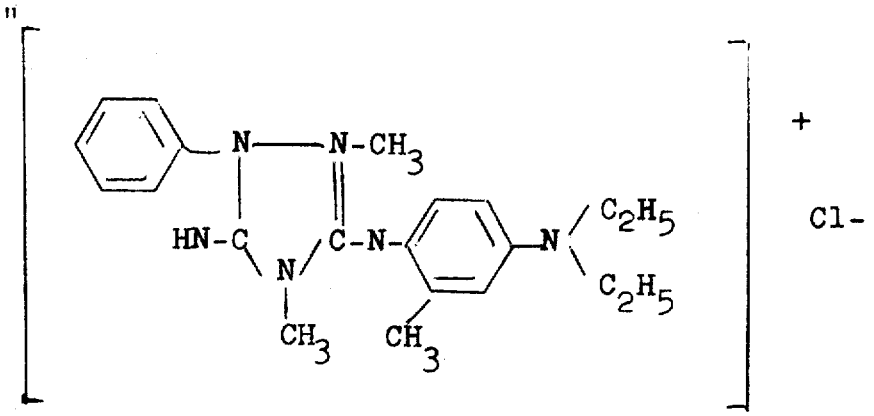

to

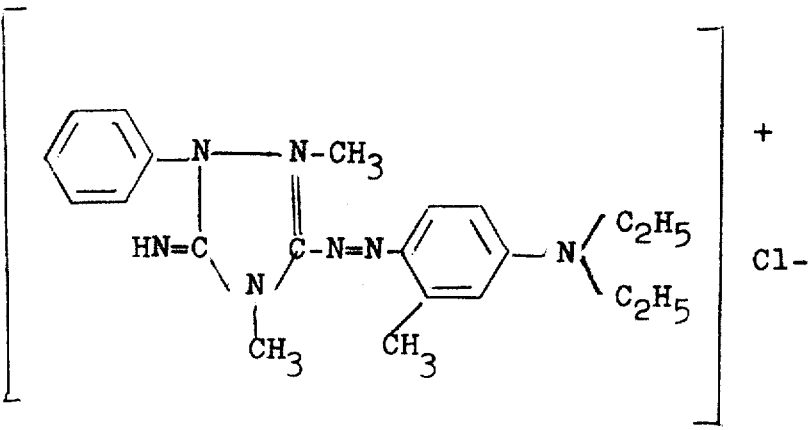

Signed and sealed this 20th day of June 1972.

(SEAL)
Attest:

EDWARD M. FLETCHER, JR.   ROBERT GOTTSCHALK
Attesting Officer   Commissioner of Patents